United States Patent Office 3,440,197
Patented Apr. 22, 1969

3,440,197
COATING SOLUTIONS AND METHODS FOR
PREPARING AND USING THE SAME
Edith M. Boldebuck, Schenectady, and Fred F. Holub,
Scotia, N.Y., assignors to General Electric Company, a
corporation of New York
No Drawing. Filed May 5, 1966, Ser. No. 547,791
Int. Cl. C08g 20/20, 20/32
U.S. Cl. 260—29.2    29 Claims

ABSTRACT OF THE DISCLOSURE

Coating solutions capable of being converted to high temperature protecting and insulating films are prepared from a mixture of an aromatic polycarboxylic acid and an aromatic diamine dissolved in a solvent mixture comprising water and a water-soluble organic amine of the class of monofunctional secondary amines and tertiary amines. By allowing these reactants to interact at a temperature below 65° C. a homogenous solution is obtained.

---

This invention relates to synthetic polymer compositions and methods of preparing such materials. More particularly, the invention is concerned with a process for making a coating solution which comprises (1) forming in water a mixture of ingredients comprising (a) at least one aromatic polycarboxylic acid selected from the group consisting of such an acid having (i) two carboxyl groups attached to non-adjacent aromatic carbon atoms, (ii) three carboxyl groups each attached to an aromatic carbon atom in which two of such groups are attached to adjacent carbon atoms, and (iii) four carboxyl groups each attached to an aromatic carbon atom in which a first pair of such groups is attached to adjacent carbon atoms and in which a second pair of such groups is attached to adjacent carbon atoms and in which the two pairs are in non-adjacent positions, (b) at least one diamine selected from the group consisting of m-phenylenediamine and diamines having the formula

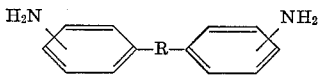

where R is a divalent radical selected from the group consisting of $C_{1-3}$ alkylene,

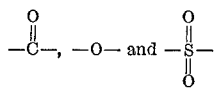

and (c) a water soluble organic amine selected from the group consisting of monofunctional secondary amines and tertiary amines, and (2) allowing the reactants to interact at a temperature below 65° C. to form a homogenous solution. This invention includes also the formation of polymers and polymeric films through the subsequent application of heat, which results in polyamides, polyimides or polyamide-imides.

U.S. Patent 3,179,614, issued Apr. 29, 1965, describes a class of resins comprising polyamide acid resins which are generally prepared by the reaction of a dianhydride of a tetracarboxylic acid with various diamines. The most widely used dianhydride is pyromellitic dianhydride, although this patent does describe a number of other dianhydrides. In accordance with this patent, the dianhydride and the diamine are reacted in the presence of a number of recited organic solvents for both the reactants and the intermediate polymeric acid amide. Additionally, this patent recites the need for employing solvents for the reaction which are relatively expensive and not readily available.

If cresol is used as the solvent in the preparation of a polyamide acid from a dianhydride such as benzophenone dianhydride and a diamine, the mixture must be heated to an elevated temperature of, for example, 100 to 160° C. to react the dianhydride and diamine since the reaction products are not soluble in this solvent at room temperature. It would be desirable to form a stable coating solution in an inexpensive solvent if the solution became a homogenous solution at a temperature below 65° C. to permit the use of the solution for coating purposes. After coating a substrate, the solution would be readily converted to the polyimide form by chemical or thermal means to produce products having excellent solvent resistance and resistance to flow at elevated temperatures.

Unexpectedly it has been discovered that it is possible to prepare homogenous coating solutions by interacting at a temperature below 65° C. aromatic polycarboxylic acids and aromatic diamines in water with the addition of water soluble organic monofunctional secondary amines or tertiary amines which on further higher heating yield high melting polymers and polymeric films.

This was entirely unexpected and in no way could have been predicted because aromatic polycarboxylic acids are generally relatively insoluble in water. In the synthesis of such polymers, it was required previously to prepare expensive intermediates, which were hydrolytically unstable, such as dianhydrides, chloroformylhydrides and diacidchlorides. These were reacted in relatively expensive anhydrous solvents, such as N-methyl-2-pyrrolidone, with aromatic diamines to produce useful polymers.

We have unexpectedly discovered that we can prepare aqueous coating solutions from aromatic diamines and aromatic polycarboxylic acids that are clear and stable indefinitely against change in composition or viscosity if we incorporate in the water as an additive a water soluble organic tertiary amine, for example, pyridine, N-methy morpholine, N-ethyl morpholine, N,N,N',N'-tetramethylbutanediamine, etc., or a water soluble monofunctional secondary amine, for example, diethylamine, morpholine, etc. These solutions are essentially free of any polymeric compositions such as the usual polyamide acids of the prior art, resulting from the reaction of the aromatic diamines and aromatic polycarboxylic dianhydrides which are comparatively unstable and tend to change in viscosity with time.

Various aromatic polycarboxylic acids selected from the above group of such acids are useful in this process. Such acids include the various isomeric benzophenonetatracarboxylic acids, isophthalic acid, trimellitic acid, and pyromellitic acid.

The various diamines which have been found useful for reacting with the above-described aromatic polycarboxylic acids are the various aromatic diamines, particularly the various diaminobenzenes, such as m-phenylenediamine, which gives polymers with the aromatic polycarboxylic acids which are soluble in water with the amine additive. Of the various binuclear diamines, those diamines in which one amino group is on each of the phenyl groups and the phenyl groups are separated by an alkylene, carbonyl, oxygen or sulfonyl radical will give solutions with the aromatic polycarboxylic acids which are soluble in water with the amine additives. Typical examples of such diamines are the various isomeric ortho-, meta-, and para-oxydianilines, e.g., 2,2'-oxydianiline, 3,3'-oxydianiline, 4,4'-oxydianiline, 2,3'-oxydianiline, 2,4'-oxydianiline, 3,4'-oxydianiline, etc., the alkylenedianilines, especially those in which the alkylene group has from one to three carbon atoms, e.g., methylenedianiline, ethylidenedianiline, ethylenedianiline, propylidenedianiline, propylenedianiline, etc., including the various ortho-, meta- and para-isomers of diaminobenzophenone, and the various ortho-, meta- and para-isomers of sulfonyldianiline. Of these diamines, m-phenylenediamine (m-PDA), 4,4'-oxydianiline (ODA), 4,4'-methylenedianiline (MDA), and 4,4'-sulfonyldianiline are the most readily available.

Generally, stoichiometric proportions of the diamine and polycarboxylic acid are employed. However, slight excesses of the aromatic diamine up to about five mol-percent excess of the molar concentration of the polycarboxylic acid are advantageously used. Improved solubility (attended by somewhat lower oxidation stability) can be obtained by utilizing up to about 20 mol-percent of the aromatic diamine with an alkylenediamine, e.g., hexamethylenediamine, 1,4-diaminobutane, etc.

After the addition of the amine additive, a clear solution is generally obtained. With some solutions, a warming of the ingredients produces the clear solution. The cyclization reaction to form the polymeric imides proceeds advantageously at a temperature of about 125° C. to 300° C. to form the polymer or a clear flexible film when cast on a glass substrate. In applying coatings, the temperatures used to remove the solvent should be raised gradually to obtain smooth coatings and films.

In forming the polymeric products it is only required to mix one or more of the above named aromatic polycarboxylic acids with one or more of the above named diamines, and with one of the above named additives in the presence of the water solvent; they go rapidly into solution and remain liquid and homogenous. The solution is then shaped and heated gradually to a temperature of at least 250° C. If desired, an inert atmosphere, e.g., nitrogen, can be used in the reaction vessel to retard oxidation of the amines to produce lighter colored polymers. Monoamines, such as aniline, p-biphenylamine, benzylamine, or a dicarboxylic acid, such as phthalic acid or maleic acid, or other reagents reactive with amines or carboxylic acids, may be used to chain-stop or modify the polymers.

The amount of aqueous solvent used should be sufficient to produce a homogenous solution with the reactants, and yet not be too viscous so as to introduce handling problems. Optimum concentrations are in the range of 5 to 50 percent, by weight, reactants and 50 to 95 percent, by weight, solvent mixture, based on the end-use. In carrying out the reaction, it is preferable to add the diamine to the water with stirring after which the amine additive and the polycarboxylic acid are added and stirred at a temperature below 65° C. to solubilize the system. Small amounts of urea can be added as a co-solvent.

In order that those skilled in the art may better understand how the invention may be practiced, the following examples are given by way of illustration and not by way of limitation. All percentages are by weight, unless otherwise stated.

EXAMPLE 1

In this example, a flask was charged with 2.10 grams trimellitic acid, 1.08 grams m-phenylenediamine (m-PDA), 14.0 grams water, and 1.0 gram pyridine. A clear solution was obtained on slight heating. When the solution was heated to 300° C., a solid polymer was obtained. A sample of this solution was also heated to 350° C. to provide a tough, flexible polymer film.

EXAMPLE 2

A mixture of 8.3 grams isophthalic acid, 10.0 grams 4,4'-methylenedianiline (MDA), 30.0 grams water and 13.0 grams pyridine was warmed slightly and a clear solution was obtained. When this solution was cast on a glass substrate and heated to 110° C., a solid was obtained which on heating to about 300° C. produced a hard, tough polymer film adhering to the glass.

EXAMPLE 3

A flask was charged with 6.0 grams trimellitic acid, 6.3 grams MDA, 30.0 grams water, and 2.5 grams pyridine, which on mixing gave a clear solution. A sample of this solution evaporated on a glass substrate at 150° C. resulted in a solid which when gradually heated to about 300° C. left a clear, yellow polymer film.

EXAMPLE 4

A mixture of 2.10 grams trimellitic acid, 3.58 grams 3,3',4,4'-benzophenonetetracarboxylic acid (BPTA), 20.0 grams water, and 5.0 grams pyridine was warmed slightly and 4.00 grams MDA were added, whereby a clear solution was obtained. A sample of the solution was placed on a glass substrate and heated for three minutes at 125° C., resulting in a clear film which was then heated over a 20-minute period to 200° C., leaving a tough polymer film deposited on the glass.

EXAMPLE 5

In this example, 1.79 grams BPTA were weighed into a flask and 1.79 grams water were added, followed by 0.53 gram pyridine and 0.54 gram m-PDA. In a short time a clear solution, stable at room temperature, was obtained. When a sample of this solution was cast on a glass substrate, heated for about 30 minutes on a hotplate regulated at 110° C., heated in a 150° C. oven for ½ hour, and heated further for about five minutes at 300° C., a tough foam was obtained, with a clear thin film around the periphery of the sample.

Additional samples of the original solution were cast on several glass substrates which were then heated for two hours on a hotplate regulated at 115° C. The various films were then heated further, each at a different cure profile as follows:

(1) 40 minutes at 135° C.; 1 hour at 150° C.; ½ hour at 200° C.; 5 minutes at 350° C.
(2) 1 hour at 150° C.; 5 minutes at 250° C.
(3) ½ hour at 200° C.; 15 minutes at 250° C.

After these additional heating conditions, all three films were light in color and free of blisters. When removed from the glass, they were moderately flexible, but films 1 and 2 broke when bent at 180° C. with a crease. Free film 2 was suspended from a clip and heated for an additional 10 minutes at 250° C. There was no observable heat distortion, and the film could now be bent 180° and creased without breaking.

EXAMPLES 6-15

In Examples 6-11, BPTA was reacted with MDA; in Example 13, BPTA and pyromellitic acid (PMA) were reacted with MDA; and in Example 15, BPTA was reacted with 4,4'-oxydianiline in the same manner as was done in Example 1 with the exceptions that the proportions of the reactants, the additives when employed, and the proportions of the additives and solvent were varied in order to form various clear solutions. The following Table 1 shows the ingredients and proportions of ingredients used, and the kind of film which was derived by casting the coating solution on a glass substrate and thereafter gradually heating the cast film for about 15 minutes at a temperature of about 30–300° C. to remove the solvent and to form the polymeric final product. It will be noted that in Example 12, a hazy solution was formed at room temperature. A sample of the solution was cast on a glass substrate and heated as described above, but no film was formed. In Example 14, BPTA, m-PDA and pyridine were mixed together in the absence of water and and the solution warmed to dissolve the ingredients. When cooled to room temperature, a large amount of precipitate formed, but when 6.0 grams water were subsequently added to the precipitated system a clear solution was immediately obtained. This aqueous solution was cast on a glass substrate and cured at 250° C. to provide a flexible polymeric film.

TABLE 1

| Example | Solvent (grams) | Additive Solvent | Acid Type | Grams |
|---|---|---|---|---|
| 6 | 44.6 | 50% N-methyl morpholine, 60% water. | BPTA | 7.16 |
| 7 | 44.6 | ___do___ | BPTA | 7.16 |
| 8 | 44.6 | 50% N,N,N',N'-tetra methyl-1,3-butane-diamine, 50% water. | BPTA | 7.16 |
| 9 | 44.6 | 50% morpholine, 50% water. | BPTA | 7.16 |
| 10 | 40.0 | 25% urea, 25% pyridine, 50% water. | BPTA | 7.16 |
| 11 | 40.0 | 50% diethylamine, 50% water. | BPTA | 7.16 |
| 12 | 40.0 | 50% pyridine, 50% water. | PMA | 5.08 |
| 13 | 40.0 | ___do___ | PMA | 5.08 |
|  |  |  | BPTA | 7.16 |
| 14 | 12.05 | ___do___ | BPTA | 0.80 |
| 15 | 48.6 | ___do___ | BPTA | 1.79 |

| Example | D amine Type | Grams | Room temp. solution | Films cast at 30–300° C. |
|---|---|---|---|---|
| 6 | MDA | 4.0 | Clear | Flexible. |
| 7 | MDA | 4.0 | ___do___ | Do. |
| 8 | MDA | 4.0 | ___do___ | Do. |
| 9 | MDA | 4.0 | ___do___ | Tough film. |
| 10 | MDA | 4.0 | ___do___ | Film. |
| 11 | MDA | 4.0 | ___do___ | Flexible. |
| 12 | MDA | 4.0 | Hazy | No film. |
| 13 | MDA | 8.0 | Clear | Flexible. |
| 14 | m-PDA | 0.25 | ___do___ | Do. |
| 15 | ODA | 1.12 | ___do___ | Do. |

Although the utility of the coating solutions of the present invention have been described in the above-mentioned patent principally in terms of applications as flexible films, it should be understood that these polymers may be used in other applications suitable for such compositions. Thus, these polymers can be employed as insulation over a conducting core. Additionally, these polymers can be employed over a conducting core previously coated with another polymer, or vice versa, to give laminated, insulated coatings on the wire to improve the properties of the insulation. They may also be used as dipping varnishes to impregnate coils of previously insulated wire, i.e., in the motor and generator rotors, field coils, etc. These polymers may also be used in molding powder formulations, by mixing with various fillers, for example, wood flour, diatomaceous earth, carbons, silica, abrasive grains, e.g., carborundum, diamond grit, etc. These polymers are also useful in preparing fibers, as impregnants, and bonding materials for metallic and fibrous laminates, etc. The polymers in film form are suitable as a dielectric in making capacitors, as slot insulation in motors, etc. These polymers can also be spray-coated from the coating solution onto a hot surface to give a good film or coating.

It has been found that in accordance with the process herein described that it is possible to form coating solutions in water with a water soluble amine which are subsequently heated to produce polyamides, polyamide-imides, or polyimides. This simple direct process allows the preparation of coating solutions that are easily prepared, are exceptionally stable, and have greater flexibility on application to glass and metal surfaces. A very simple mixing technique may be applied to produce a solution useful for bonding glass fibers, for making laminations and for coating metal substrates for use as thermal and electrical insulating films.

It will of course be apparent to those skilled in the art that other aromatic polycarboxylic acids and other aromatic diamines may be employed in place of those recited in the foregoing examples, many illustrations of these reactants being given previously, without departing from the scope of the invention. The ratio of reactants as well as the proportions of the solvent and amine additive may also be varied within the ranges set forth above. The amount of amine additive used should be that required to give an essentially homogenous solution; on a weight basis, the amine additive may comprise from about 2 to as high as 50 percent or more of the weight of the water. It is also to be understood that the conditions of reaction, formation of the coating solution, and of the ultimate polyamide, polyamide-imide, or polyimide product can also be varied widely in accordance with the intended invention. The incorporation of other additives such as light stabilizers, oxidation inhibitors, levelling additives, etc., is not precluded.

What we claim as new and desire to secure by Letters Patent of the United States is:

1. The process for making a coating solution which comprises (1) forming in water a mixture of ingredients consisting essentially of (a) at least one aromatic polycarboxylic acid selected from the group consisting of such an acid having (i) two carboxyl groups attached to non-adjacent aromatic carbon atoms, (ii) three carboxyl groups each attached to an aromatic carbon atom in which two of such groups are attached to adjacent carbon atoms, and (iii) four carboxyl groups each attached to an aromatic carbon atom in which a first pair of such groups is attached to adjacent carbon atoms and in which a second pair of such groups is attached to adjacent carbon atoms and in which the two pairs are in non-adjacent positions, (b) at least one diamine selected from the group consisting of m-phenylenediamine and diamines having the formula

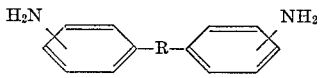

where R is a divalent radical selected from the group consisting of $C_{1-3}$ alkylene,

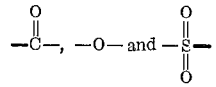

and (c) a water soluble organic amine selected from the group consisting of monofunctional secondary amines and tertiary amines, and (2) allowing the reactants to interact at a temperature below 65° C. to form a homogenous solution, the water comprising, on a weight basis, from 50 to 95 percent of the combined weight of the water, (a), and (b), and the monofunctional amine comprising, on a weight basis, from 2 to 50 percent of the weight of the water.

2. A process as in claim 1, wherein the polycarboxylic acid is 3,3',4,4'-benzophenonetetracarboxylic acid.

3. A process as in claim 1, wherein the polycarboxylic acid is trimellitic acid, the diamine is m-phenylenediamine, and the water soluble organic amine is pyridine.

4. A process as in claim 1, wherein the polycarboxylic acid is isophthalic acid, the diamine is 4,4'-methylenedianiline, and the water soluble organic amine is pyridine.

5. A process as in claim 1, wherein the polycarboxylic acid is trimellitic acid, the diamine is 4,4'-methylenedianiline, and the water soluble organic amine is pyridine.

6. A process as in claim 1, wherein the polycarboxylic acids are trimellitic acid and 3,3',4,4'-benzophenonetetracarboxylic acid, the diamine is 4,4'-methylenedianiline, and the water soluble organic amine is pyridine.

7. A process as in claim 1, wherein the polycarboxylic acids are pyromellitic acid and 3,3',4,4'-benzophenonetetracarboxylic acid, the diamine is 4,4'-methylenedianiline, and the water soluble organic amine is pyridine.

8. A process as in claim 1, wherein the polycarboxylic acid is 3,3',4,4'-benzophenonetetracarboxylic acid, the diamine is m-phenylenediamine, and the water soluble organic amine is pyridine.

9. A process as in claim 1, wherein the polycarboxylic acid is 3,3',4,4'-benzophenonetetracarboxylic acid, the diamine is 4,4'-methylenedianiline, and the water soluble organic amine is N-methyl morpholine.

10. A process an in claim 1, wherein the polycarboxylic acid is 3,3',4,4'-benzophenonetetracarboxylic acid, the diamine is 4,4'-methylenedianiline, and the water soluble organic amine is N-ethyl morpholine.

11. A process as in claim 1, wherein the polycarboxylic acid is 3,3',4,4'-benzophenonetetracarboxylic acid, the diamine is 4,4'-methylenedianiline, and the water soluble organic amine is N,N,N',N' - tetramethyl - 1,3 - butanediamine.

12. A process as in claim 1, wherein the polycarboxylic acid is 3,3',4,4'-benzophenonetetracarboxylic acid, the diamine is 4,4'-methylenedianiline, and the water soluble organic amine is morpholine.

13. A process as in claim 1, wherein the polycarboxylic acid is 3,3',4,4'-benzophenonetetracarboxylic acid, the diamine is 4,4'-methylenedianiline, and the water soluble organic amine is diethylamine.

14. A process as in claim 1, wherein the polycarboxylic acid is 3,3',4,4'-benzophenonetetracarboxylic acid, and the diamine is m-phenylenediamine.

15. A process as in claim 1, wherein the polycarboxylic acid is 3,3',4,4'-benzophenonetetracarboxylic acid, the diamine is 4,4'-oxydianiline, and the water soluble organic amine is pyridine.

16. A coating solution comprising (1) a mixture of ingredients consisting essentially of (a) at least one aromatic polycarboxylic acid selected from the group consisting of such an acid having (i) two carboxylic groups attached to non-adjacent aromatic carbon atoms, (ii) three carboxyl groups each attached to an aromatic carbon atoms in which two of such groups are attached to adjacent carbon atoms, and (iii) four carboxyl groups each attached to an aromatic carbon atom in which a first pair of such groups is attached to adjacent carbon atoms and in which a second pair of such groups is attached to adjacent carbon atoms and in which the two pairs are in non-adjacent positions, (b) at least one diamine selected from the group consisting of m-phenylenediamine, and diamines having the formula

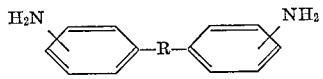

where R is a divalent radical selected from the group consisting of $C_{1-3}$ alkylene,

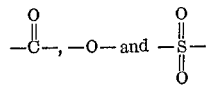

and (c) a water soluble organic amine selected from the group consisting of monofunctional secondary amines and tertiary amines, and (2) water, the water comprising, on a weight basis, from 50 to 95 percent of the combined weight of the water, (a), and (b), and the monofunctional amine comprising, on a weight basis, from 2 to 50 percent of the weight of the water.

17. A composition as in claim 16, in which the polycarboxylic acid is 3,3',4,4'-benzophenonetetracarboxylic acid.

18. A composition as in claim 16, in which the polycarboxylic acid is trimellitic acid, the diamine is m-phenylenediamine, and the water soluble organic amine is pyridine.

19. A composition as in claim 16, in which the polycarboxylic acid is isophthalic acid, the diamine is 4,4'-methylenedianiline, and the water soluble organic amine is pyridine.

20. A composition as in claim 16, in which the polycarboxylic acid is trimellitic acid, the diamine is 4,4'-methylenedianiline, and the water soluble organic amine is pyridine.

21. A composition as in claim 16, in which the polycarboxylic acids are trimellitic acid and 3,3',4,4'-benzophenonetetracarboxylic acid, the diamine is 4,4'-methylenedianiline, and the water soluble organic amine is pyridine.

22. A composition as in claim 16, in which the polycarboxylic acids are pyromellitic acid and 3,3',4,4'-benzophenonetetracarboxylic acid, the diamine is 4,4'-methylenedianiline, and the water soluble organic amine is pyridine.

23. A composition as in claim 16, in which the polycarboxylic acid is 3,3',4,4'-benzophenonetetracarboxylic acid, the diamine is m-phenylenediamine, and the water soluble organic amine is pyridine.

24. A composition as in claim 16, in which the polycarboxylic acid is 3,3',4,4'-benzophenonetetracarboxylic acid, the diamine is 4,4'-methylenedianiline, and the water soluble organic amine is N-methyl morpholine.

25. A composition as in claim 16, in which the polycarboxylic acid is 3,3',4,4'-benzophenonetetracarboxylic acid, the diamine is 4,4'-methylenedianiline, and the water soluble organic amine is N-ethyl morpholine.

26. A composition as in claim 16, in which the polycarboxylic acid is 3,3',4,4'-benzophenonetetracarboxylic acid, the diamine is 4,4'-methylenedianiline, and the water soluble organic amine is N,N,N',N'-tetramethyl-1,3-butanediamine.

27. A composition as in claim 16, in which the polycarboxylic acid is 3,3',4,4'-benzophenonetetracarboxylic acid, the diamine is 4,4'-methylenedianiline, and the water soluble amine is morpholine.

28. A composition as in claim 16, in which the polycarboxylic acid is 3,3',4,4'-benzophenonetetracarboxylic acid, the diamine is 4,4'-methylenedianiline, and the water soluble organic amine is diethylamine.

29. A composition as in claim 16, in which the polycarboxylic acid is 3,3',4,4'-benzophenonetetracarboxylic acid, the diamine is 4,4'-oxydianiline, and the water soluble organic amine is pyridine.

References Cited

UNITED STATES PATENTS

| | | | |
|---|---|---|---|
| 2,244,192 | 6/1941 | Flory | 260—78 |
| 2,766,222 | 10/1956 | Lum et al. | 260—78 |
| 2,880,230 | 3/1959 | Edwards et al. | 260—78 |
| 2,902,475 | 9/1959 | Burkhard | 260—78 |
| 3,179,614 | 4/1965 | Edwards | 260—30.2 |
| 3,179,631 | 4/1965 | Endrey | 260—29.2 |
| 3,190,856 | 6/1965 | Lavin et al. | 260—65 |

OTHER REFERENCES

APC application of Hopff et al. Ser. No. 389,002, published Apr. 20, 1943 (now abandoned).

SAMUEL H. BLECH, *Primary Examiner.*

J. T. GOOLKASIAN, *Assistant Examiner.*

U.S. Cl. X.R.

260—47, 49, 78